United States Patent
Tse

(10) Patent No.: US 10,351,739 B2
(45) Date of Patent: Jul. 16, 2019

(54) ADHESIVE COMPOSITIONS WITH SYNDIOTACTIC-RICH POLYOLEFINS

(71) Applicant: ExxonMobil Chemical Patents Inc., Baytown, TX (US)

(72) Inventor: Mun Fu Tse, Seabrook, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 226 days.

(21) Appl. No.: 15/123,276

(22) PCT Filed: Mar. 23, 2015

(86) PCT No.: PCT/US2015/021958
§ 371 (c)(1),
(2) Date: Sep. 2, 2016

(87) PCT Pub. No.: WO2015/167692
PCT Pub. Date: Nov. 5, 2015

(65) Prior Publication Data
US 2017/0058156 A1  Mar. 2, 2017

Related U.S. Application Data

(60) Provisional application No. 61/985,680, filed on Apr. 29, 2014.

(51) Int. Cl.
| | | |
|---|---|---|
| *C09J 123/16* | (2006.01) | |
| *C08L 23/12* | (2006.01) | |
| *C08L 51/06* | (2006.01) | |
| *C09J 123/12* | (2006.01) | |
| *C09J 123/14* | (2006.01) | |

(52) U.S. Cl.
CPC ............. *C09J 123/16* (2013.01); *C08L 23/12* (2013.01); *C08L 51/06* (2013.01); *C09J 123/12* (2013.01); *C09J 123/142* (2013.01); *C08L 2205/025* (2013.01); *C08L 2207/12* (2013.01)

(58) Field of Classification Search
CPC .... C09J 123/16; C09J 123/12; C09J 123/142; C08L 2205/025; C08L 2207/12; C08L 23/12; C08L 51/06
USPC .......................................................... 524/528
See application file for complete search history.

(56) References Cited

U.S. PATENT DOCUMENTS

| | | |
|---|---|---|
| 7,294,681 B2 | 11/2007 | Jiang et al. |
| 7,524,910 B2 | 4/2009 | Jiang et al. |
| 2013/0134038 A1 | 5/2013 | Sato et al. |

FOREIGN PATENT DOCUMENTS

| | | | |
|---|---|---|---|
| WO | 2005/100501 | 10/2005 | |
| WO | WO-2005100501 A1 * | 10/2005 | ............ C09J 123/10 |
| WO | 2007/002177 | 1/2007 | |

OTHER PUBLICATIONS

Tse, "*Studies of triblock copolymer-tackifying resin interactions by viscoelasticity and adhesive performance*," Journal of Adhesion Science and Technology, 1989, vol. 3, pp. 551-570.

Tse, "*Application of Adhesion Model for Developing Hot Melt Adhesives Bonded t0 Polyolefin Surfaces*," Journal of Adhesion, 1995, vol. 48, pp. 149-167.

\* cited by examiner

*Primary Examiner* — Ronald Grinsted

(57) ABSTRACT

The present invention is related to adhesive compositions comprising a polymer blend of at least two different propylene-based polymers and one or more syndiotactic-rich polyolefins. The syndiotactic-rich polyolefin comprises greater than about 50 wt % of a $C_3$-$C_{40}$ alpha olefins and having about 50% to less than about 80% r dyads, based on the total number of r and m dyads present in the polymer.

22 Claims, 1 Drawing Sheet

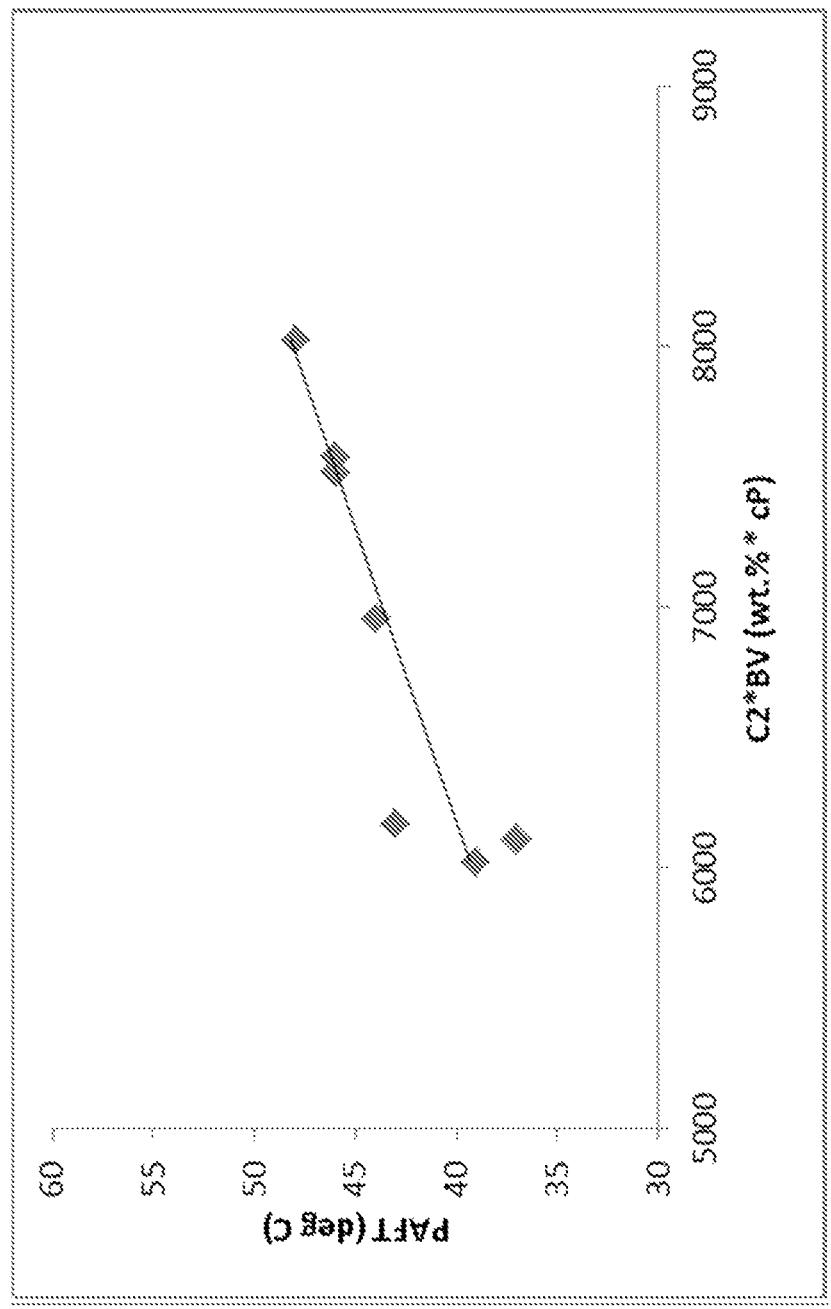

ADHESIVE COMPOSITIONS WITH SYNDIOTACTIC-RICH POLYOLEFINS

CROSS REFERENCE TO RELATED APPLICATION

This present application is a National Stage Application of International Application No. PCT/US2015/021958, filed Mar. 23, 2015, which claims priority to U.S. Provisional Patent Application No. 61/985,680, filed Apr. 29, 2014, the disclosure of which is incorporated herein by reference in its entirety.

FIELD OF INVENTION

The invention relates to an adhesive composition that includes at least one syndiotactic-rich polyolefin.

BACKGROUND

Adhesive compositions are sought for hot melt adhesive packaging applications that provide a desired combination of physical properties, such as reduced set time and improved mechanical strength, including fiber tear and good adhesion at broad application temperatures.

Exemplary base polymer compositions and methods of making polymer compositions for HMA applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers. In addition, the process platform described in these patents can sometimes be of limited robustness for developing new products or altering product design to satisfy customer needs.

International Publication No. 2013/134038 discloses a method for producing a polymer blend having at least two different propylene-based polymers produced in parallel reactors. The multi-modal polymer blend has an Mw of 10,000 g/mol to 150,000 g/mol.

Accordingly, the present invention is directed to adhesive compositions utilizing the new polymer blends combined with one or more syndiotactic-rich polyolefin, such that the adhesive compositions have superior fiber tear, set time, and peel compared to the known adhesive.

SUMMARY

The foregoing and/or other challenges are addressed by the methods and products disclosed herein.

In one aspect, an adhesive composition comprising: i) a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of 900 cP to 19,000 cP; and ii) a syndiotactic-rich polyolefin comprising greater than 50 wt % of a $C_3$-$C_{40}$ alpha olefins and having 50% to less than 80% r dyads, based on the total number of r and m dyads present in the polymer, and a heat of fusion of 10 joules/g or less.

These and other aspects of the present inventions are described in greater detail in the following detailed description and are illustrated in the accompanying tables.

BRIEF DESCRIPTION OF THE DRAWINGS

FIG. 1 illustrates the relationship of increasing adhesion, measured as peel adhesion failure temperature ("PAFT"), with increased ethylene concentration and/or increased adhesive composition viscosity.

DETAILED DESCRIPTION

It has been discovered that certain multi-modal polymer blends having a unique and desirable combination of advantageous properties for polyolefin adhesive applications, including set times, fiber tear, and adhesion (measured by, for example, peel adhesion failure temperature) at broad application temperature. It has been discovered that improved adhesive performance is provided by including one or more syndiotactic-rich polyolefins with the multi-modal polymer blends.

Advantageously, polymers used in the adhesive composition herein can be produced using the new process platform that share many of the characteristics of the LINXAR™ polymers that make the LINXAR™ polymers excellent polymers for use in adhesive applications. New multi-modal polymers can be produced using the new process platform that possess other characteristics that, although differentiate the polymers from the LINXAR™ polymers, are believed to contribute to the new polymers' excellent adhesive performance. These multi-modal polymers may have a melt viscosity, measured at 190° C. of about 900 cP to about 19,000 cP.

In any embodiment, one or more of the polymers described herein may be blended with another polymer, such as another polymer described herein, to produce a physical blend of polymers, preferably a multi-modal polymer blend. The term "blend" as used herein refers to a mixture of two or more polymers. The term "multi-modal" as used herein refers to a blend of two or more distinct polymer species in which each species is distinguishable from another species present in the blend on the basis of at least one chemical or physical property such as molecular weight, molecular weight distribution, melt viscosity, comonomer content, crystallinity, and combinations thereof. Multi-modal polymer blends useful in the inventive polyolefin adhesive compositions are disclosed in International Application No. 2013/134038, which is incorporated here by reference in entirety.

In one embodiment, an adhesive composition comprising: i) a polymer blend comprising a first propylene-based polymer, wherein the first propylene-based polymer is a homopolymer of propylene or a copolymer of propylene and ethylene or a $c_4$ to $c_{10}$ alpha-olefin; a second propylene-based polymer, wherein the second propylene-based polymer is a homopolymer of propylene or a copolymer of propylene and ethylene or a $c_4$ to $c_{10}$ alpha-olefin; wherein the second propylene-based polymer is different than the first propylene-based polymer; and ii) a syndiotactic-rich polyolefin. In another aspect, the syndiotactic-rich polyolefin is functionalized with a functional group.

In a preferred embodiment, the adhesive composition comprises a blend which includes syndiotactic rich polyolefin present at about 1 wt % to about 50 wt %, based upon the total weight of the blend, more preferably the syndiotactic rich polyolefin is present at greater than about 5 wt %, preferably greater than about 10 wt %, preferably greater than about 20 wt %, preferably greater than about 30 wt %, preferably greater than about 40 wt %, based on the total weight of the adhesive composition.

One measure of adhesive composition performance is peel adhesion failure temperature. "Peel adhesion failure temperature" (PAFT) is defined as the temperature at which the adhesive bond of the composition fails. PAFT is tested according to the standard PAFT test based on ASTM D4498. PAFT is measured in ° C. Higher values are desired.

The adhesion model, published in Tse, M. F., *J. Adhesion Sci. Technol.* 1989, 3, 551, Tse, M. F., *J. Adhesion* 1995, 48, 149, Tse, M. F., *J. Adhesion* 1998, 66, 61, and Tse, M. F., *J. App. Polym. Sci.* 2014, 131(3), 10.1002/APP.39855, indicates that adhesion, such as PAFT, increases as the product of ethylene content ($C_2$ wt %) and viscosity (Brookfield viscosity or "BV" measured at 190° C.) for low viscosity adhesive compositions containing copolymers of propylene and ethylene due to the following explanation. The adhesion model states adhesion, P, is predicted as follows:

$$P = Po*B*D$$

where Po is interfacial adhesion term accounting for molecular interactions at the interface, B is bonding term accounting for ease of wetting and spreading in forming the bond, and D is debonding term accounting for transfer of stress into bulk of adhesive during debonding.

The Po term accounts for molecular interactions at the adhesive/substrate interface. Surface tensions of cardboard and Kraft paper are high due to their polar, cellulosic structures. Surface tension of polyethylene is higher than surface tension of polypropylene because the pendant methyl groups in polypropylene lower the surface tension of polypropylene. In a propylene-ethylene copolymer, higher ethylene content will increase the copolymer surface tension. This will enhance the interfacial interactions (Po) of the copolymer with either the cardboard or the Kraft paper due to the lower degree of mismatch in surface tension of these two materials. Therefore, the Po term for propylene-ethylene copolymers is a function of ethylene concentration ($C_2$ wt %) in the copolymer (increasing Po as $C_2$ wt % increases).

The B term accounts for ease of wetting and spreading by polymer during bonding. Adhesive compositions having low viscosity fulfill the necessary amount of wetting and bonding to the substrate. Therefore, the B term for low viscosity adhesive compositions remains relatively constant in analogy to the Dahlquist criterion used to study tack of pressure sensitive adhesives. (See Dahlquist, C. A. in: *Adhesion: Fundamentals and Practice* 1966, MacLaren, London.)

The D term accounts for transfer of stress into bulk adhesive during debonding. The D term depends on the bulk properties of the adhesive. The Mw of the composition is related to the Brookfield viscosity. Higher Brookfield viscosity generally indicates higher Mw. If the base polymer of the adhesive composition has a high Brookfield viscosity (BV), the adhesive composition should have a higher cohesive strength due to the high molecular weight of the base polymer. This implies the D term is a function of BV (D increases as BV increases).

The adhesion, P, may now be represented as follows:

$$P \propto Po*D,$$

or substituting terms, $$P \propto (C_2 \text{ content})*BV$$

where the $C_2$ content may be the wt % ethylene and BV the Brookfield viscosity in cP. Consequently, P, which is proportional to Po*D, will be increased with increasing $C_2$ content, BV, or ($C_2$ content)*(BV).

FIG. 1 demonstrates the adhesion model relationship of increasing adhesion (PAFT) as the product of ($C_2$*BV) increases for seven adhesive compositions comprising 91 wt % of one of propylene-ethylene copolymers P3 through P9 respectively (see Table 1) as well as 5 wt % POLYWAX™ 3000 (a wax), 3.5 wt % A-C™ 596 (a functionalized polyolefin additive), and 0.5 wt % Irganox™ 1010 (an antioxidant). PAFT was tested for each composition in FIG. 1 according to the standard PAFT test based on ASTM D4498.

The ($C_2$*BV) value is calculated as follows:

$$[\Sigma w_i * C_{2i}] * [\exp(\Sigma w_i * \ln BV_i)]$$

where $w_i$ is the relative weight fraction of component i present in the adhesive composition, $C_{2i}$ is the weight percent ethylene content of component i and $BV_i$ is the Brookfield viscosity measured at 190° C. of component i. The ($C_2$*BV) value calculation only considers the srPP and the propylene-based polymer components present in the adhesive composition. The relative weight fraction, $w_i$, is calculated as the weight percent of component i (chosen from one of the srPP and the propylene-based polymer components) divided by the sum of the weight percents for the srPP and the propylene-based polymer components present in the adhesive composition (excluding the weight percents of additives).

In an embodiment, the adhesive composition has ($C_2$*BV)≥4900 (wt %*cP), for example, ≥5000 (wt %*cP), ≥5100 (wt %*cP), ≥5200 (wt %*cP), ≥5300 (wt %*cP), ≥5400 (wt %*cP), ≥5800 (wt %*cP), and ≥6400 (wt %*cP), where Brookfield viscosity in cP is measured at 190° C.).

Another measure of adhesive composition performance is fiber tear. "Fiber tear" describes the bond strength of the adhesive to the substrate and is measured at 25° C. (room temperature), 2° C. (refrigerator temperature), and −18° C. (freezer temperature). Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. Fiber tear is determined by bonding together substrates with the adhesive. A drop of molten adhesive (180° C.) is positioned on one of the substrates. The second substrate is placed on top of the adhesive, and a 500 g weight is placed on top of the second substrate for even application. The adhesive is cooled at the referenced temperature for at least one hour. The substrates are then torn apart and the adhesive is inspected for fiber tear. In the present invention, higher fiber tear is desirable. The substrate used to measure fiber tear in this application and in the examples is paperboard 84C, a corrugated cardboard 200# stock available from Huckster Packaging Supply in Houston, Tex. The fiber tear is reported as a percent (%) of fibers that remain on the substrate.

Another method "Set time" is the minimum time interval, after bonding two substrates, during which the cohesive strength of the bond becomes stronger than joint stress. It represents the time necessary to cool down an adhesive composition and obtain a good bond. Set time is determined by bonding together substrates with the adhesive after the molten adhesive (180° C.) has been dropped onto one of the substrates with an eye dropper. The second substrate is placed on top of the adhesive, and a 500 g weight is placed on top of the second substrate for even application. After a predetermined interval of time, the second substrate is removed and checked for fiber tear. If no fiber tear is found, a longer interval of time is tried. This is continued until fiber tear is found. This length of time is reported as the set time in seconds.

Methods of Preparing Adhesive Components and Compositions

A solution polymerization process for preparing a polyolefin adhesive component is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second reactor may receive a third monomer feed of a third monomer, a fourth monomer feed of a fourth monomer, and a catalyst feed of a second catalyst. The second reactor may also receive feeds of a solvent and activator. The solvent and/or the activator feed may be combined with any of the third monomer feed, the fourth monomer feed, or second catalyst feed, or the solvent and activator may be supplied to the reactor in separate feed streams. A second polymer is produced in the second reactor and is evacuated from the second reactor via a second product stream. The second product stream comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor may be designed to produce a polymer that is predominantly propylene, i.e., a polymer that is more than 50 mol % propylene. In another embodiment, the second reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous blends are described in greater detail herein.

It should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor and second reactor or the third reactor may be in series with one of the first reactor and second reactor.

Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

International Publication No. 2013/134038 generally describes the method of preparing polyolefin adhesive components and compositions. The content of International Publication No. 2013/134038 is incorporated herein in its entirety.

Polymers

Preferred polymers are semi-crystalline propylene-based polymers. In any embodiment, the polymers may have a relatively low molecular weight, preferably about 150,000 g/mol or less, more preferably about 80,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more propylene-based polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers of the propylene-based polymer may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers of the propylene-based polymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

In any embodiment, the Tm of the one or more polymers of the blend (as determined by DSC) may be less than about 130° C., or less than about 125° C., less than about 120° C., or less than about 115° C., or less than about 110° C., or less than about 100° C., or less than about 90° C., and greater than about 70° C., or greater than about 75° C., or greater than about 80° C., or greater than about 85° C. In any embodiment, the Tm of the one or more polymers of the blend may be greater than about 25° C., or greater than about 30° C., or greater than about 35° C., or greater than about 40° C. Tm of the polymer blend can be determined by taking 5 to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In any embodiment, the Tm of the one or more polymers of the blend (as determined by DSC) may be less than about 130° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the first crystallization temperature (Tc1) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the polymer is greater than about 0° C., or greater than about 5° C., or greater than about 10° C., or greater than about 15° C., or greater than about 20° C. In any embodiment, the Tc1 lower limit of the polymer may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the polymer (as determined by DSC) is less than about 120° C., or less than about 110° C., or less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or greater than about 20° C. In any embodiment, the Tc2 lower limit of the polymer may be 0° C., 5° C., 10° C., 20° C., 30° C., 40° C., 50° C., 60° C., and 70° C.; and the Tc2 upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotactic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in *Macromolecules*, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D792.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol. Preferably, the semi-crystalline polymer has a weight average molecular weight (Mw) of from about 5,000 to about 80,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, 2001, Volume 34, Number 19, pp. 6812-6820.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 m glass pre-filter and subsequently through a 0.1 m Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 mg/mL to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_O$ is the optical constant for the system:

$$K_o = \frac{4\pi^2 n^2 \left(\frac{dn}{dc}\right)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_V$ is the viscosity-average molecular weight based on molecular weights determined by the LS analysis:

$$M_V = (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D3236 from about 100 cP to about 500,000 cP, or from about 100 cP to about 100,000 cP, or from about 100 cP to about 50,000 cP, or from about 100 cP to about 25,000 cP, or from about 100 cP to about 15,000 cP, or from about 100 cP to about 10,000 cP, or from about 100 cP to about 5,000 cP, or from about 200 cP to about 1,500 cP, or from about 500 cP to about 15,000 cP, or from about 500 cP to about 10,000 cP, or from about 500 cP to about 5,000 cP, or from about 1,000 cP to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP, or less than about 1,500 cP with ranges from any lower limit to any upper limit being contemplated.

The polymers that may be used in the adhesive compositions disclosed herein generally include any of the polymers formed as disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. The contents of International Publication No. 2013/134038 is incorporated herein in its entirety.

Polymers and blended polymer products are also provided. In any embodiment, one or more of the polymers described herein may be blended with another polymer, such as another polymer described herein, to produce a physical blend of polymers.

Catalysts/Activators

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, µ-dimethylsilylbis(indenyl) hafnium dimethyl and µ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl)indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a $-(CH_2)_a-$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula (I):

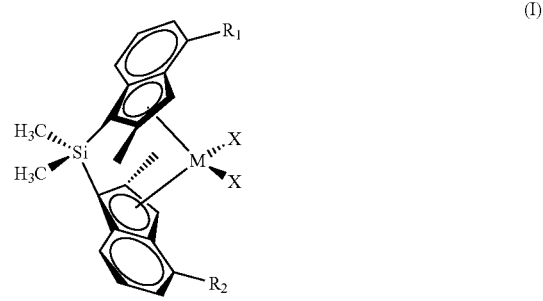

(I)

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, $R_1$ and $R_2$ may be independently selected from the group consisting of hydrogen, phenyl, and naphthyl. $R_1$ is preferably the same as $R_2$. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl)borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_nAlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

International Publication No. 2013/134038 generally describes the catalysts, activators, and solvents used to prepare the polymer blend used in the adhesive compositions. The contents of International Publication No. 2013/134038 and its parent application U.S. Patent Application Ser. No. 61/609,020, filed Mar. 9, 2012, are both incorporated herein in their entirety.

Syndiotactic-Rich Polyolefins

It has been discovered that improved adhesive performance is provided by including one or more syndiotactic-rich polyolefins with one or more polymer blends in the adhesive composition. Examples of syndiotactic-rich polyolefins are disclosed in, for example, U.S. Pat. No. 7,589,145, which is incorporated by reference in its entirety.

A syndiotactic-rich polyolefin polymer (srPP) may comprise at least about 50% r-dyads as determined according to the Ewen method (see J. A. Ewen, "Catalytic Polymerization of Olefins"). In a preferred embodiment, a srPP may include about at least about 55% r dyads, preferably at least 58% r dyads, preferably at least about 60% r dyads, preferably at least about 65% r dyads, preferably at least about 70% r dyads, preferably at least about 75% r dyads, more preferably less than about 80% r dyads, even more preferably less than about 78% r dyads, based on the total number of r and m dyads present in the polymer.

An amorphous syndiotactic-rich polyolefin polymer (a-srPP) may include a syndiotactic-rich polyolefin polymer, essentially all of which is soluble in hexane, cyclohexane, toluene or xylene at room temperature.

An amorphous syndiotactic-rich polyolefin polymer (a-srPP) may comprise about 50% r-dyads to less than about 80% r-dyads, based on the total number of dyads present in the polymer. In a preferred embodiment, an amorphous srPP may include about 55% r dyads to about 75% r dyads, preferably about 60% r dyads to about 75% r dyads, preferably about 60% r dyads to about 70% r dyads, preferably about 65% r dyads to about 70% r dyads, preferably about 58% r dyads to about 78% r dyads, based on the total number of r-dyads present in the polymer.

An amorphous syndiotactic-rich polyolefin polymer (a-srPP) may comprise about 6.25% to about 31.6% r-pentads, based on the total number of r-pentads present in the polymer. In a preferred embodiment, an amorphous srPP may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r-pentads present in the polymer.

In a preferred embodiment, the amorphous syndiotactic-rich polyolefin polymer is amorphous syndiotactic-rich polypropylene (a-srPPr). The a-srPPr preferably has a weight average molecular weight (Mw) of 5,000,000 or less, a number average molecular weight (Mn) of about 3,000,000 or less, a z-average molecular weight (Mz) of about 10,000,000 or less, and a g' index of 1.5 or less measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the a-srPPr of the present invention, may have a Mw of about 5,000 g/mole to about 5,000,000 g/mole, more preferably a Mw of about 10,000 to about 1,000,000, more preferably a Mw of about 20,000 to about 500,000, more preferably a Mw of about 50,000 to about 300,000, more preferably a Mw of about 50,000 to about 100,000, wherein Mw is determined as described herein.

In a preferred embodiment, the a-srPPr of the present invention may have a Mn of about 5,000 g/mole to about 3,000,000 g/mole, more preferably a Mn of about 10,000 to about 1,000,000, more preferably a Mn of about 30,000 to about 500,000, more preferably a Mn of about 50,000 to about 200,000, wherein Mn is determined as described herein.

In a preferred embodiment, the a-srPPr of the present invention may have a Mz of about 10,000 to about 10,000,000 g/mole, more preferably a Mz of about 50,000 to about 1,000,000, more preferably a Mz of about 80,000 to about 500,000, more preferably a Mz of about 100,000 to about 300,000, wherein Mw is determined as described herein.

In a preferred embodiment, the a-srPPr of the present invention may have a g' index value of about 0.9 to about 1.5, more preferably a g' of about 0.9 to about 1.45, when measured at the Mw of the polymer using the intrinsic viscosity of isotactic polypropylene as the baseline, wherein g' is defined, and is determined as described herein.

In a preferred embodiment, the a-srPPr of the present invention may have a crystallization temperature (Tc) measured with differential scanning calorimetry (DSC) of about 200° C. or less, more preferably, 150° C. or less, more preferably no crystallization temperature is not discernable.

In a preferred embodiment, the a-srPPr of the present invention may have a density of about 0.85 to about 0.95 g/ml, more preferably, about 0.87 to about 0.92 g/ml, more preferably about 0.88 to about 0.91 g/ml at room temperature as measured per the ASTM D-1505 test method.

In a preferred embodiment, the a-srPPr of the present invention may have a melt flow rate (MFR), which is inversely related to weight average molecular weight Mw, equal to or greater than 0.2 g/10 min, preferably between 2-500 g/10 min and more preferably between 20-200 g/10 min, as measured according to the ASTM D1238 (190c, 2.16 kg) test method.

The amorphous syndiotactic-rich polyolefin may include alpha olefin within the base polymer such that the amorphous syndiotactic-rich polyolefin may have greater than about 50 wt % of one of $C_3$-$C_{40}$ alpha olefins, preferably greater than about 50 wt % of one of $C_3$-$C_{20}$ alpha olefins, preferably greater than about 50 wt % of one of $C_3$-$C_{12}$ alpha olefins, and more preferably greater than about 50 wt % of one of $C_3$-$C_{10}$ alpha olefins.

Preferably, the amorphous syndiotactic-rich polyolefin may include greater than about 60 wt % propylene, preferably greater than about 70 wt % propylene, preferably greater than about 80 wt % propylene, preferably greater than about 90 wt % propylene, preferably greater than about 95 wt % propylene, preferably greater than about 99 wt % propylene, based on the total weight of the polymer.

The amorphous syndiotactic-rich polyolefin of the present invention may further include comonomer such as greater than about 0.5 wt % ethylene, preferably greater than about 1 wt % ethylene, preferably greater than about 2 wt % ethylene, preferably greater than about 3 wt % ethylene, preferably greater than about 4 wt % ethylene, preferably greater than about 5 wt % ethylene, based on the total weight of the polymer.

In an embodiment, the a-srPPr may include at least about 50 wt % propylene ($C_3$) as the base polymer, along with comonomer such as, one of ethylene ($C_2$) and from $C_4$ to $C_{40}$ alpha olefins, preferably $C_4$ to $C_{20}$ alpha olefins, more preferably $C_4$ to $C_{12}$ alpha olefins, with $C_2$ and $C_4$ to $C_{10}$ alpha olefins being still more preferred.

Examples of preferred alpha olefin comonomers include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1, 4-methylepentene-1, and 4,4-dimethylepentene-1.

The amount of alpha olefin comonomers, when present in the a-srPP, may be greater than about 0.001% by weight (wt %), based on the total weight of the polymer. Preferably, the amount of the alpha olefin comonomers is greater than or equal to about 0.1 wt %, more preferably greater than or equal to about 1 wt %. The other alpha olefin comonomer may also be present in the base polymer at about 50 wt % or less. Preferably, the amount of the alpha olefin comonomer is less than or equal to about 20 wt %, more preferably less than or equal to about 10 wt %.

In a preferred embodiment, essentially all of the a-srPP (preferably a-srPPr) of the present invention is essentially amorphous, by which it is meant that essentially all of the a-srPP is soluble in hexane, cyclohexane, xylene or toluene at room temperature. As used herein, by essentially all of the s-srPP it is meant that at least about 95 wt %, preferably at least about 96 wt %, preferably at least about 97 wt %, preferably at least about 98 wt %, preferably at least about 99 wt %, preferably at least about 99.5 wt % of the a-srPP is soluble in hexane, cyclohexane, xylene or toluene at room temperature (i.e., 25° C.), based on the total weight of the a-srPP present.

In a preferred embodiment, the a-srPP, more preferably the a-srPPr, of the present invention may have a heat of fusion (Hf) determined according to the procedure described in ASTM E794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, still more preferably, a heat of fusion which is not detectable according to the procedure described in ASTM E794-85.

In a preferred embodiment, the a-srPP, more preferably the a-srPPr, of the present invention may have an ash content, determined according to the procedure described in ASTM D5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D5630 of less than or equal to about 0.001 wt % ash content being still more preferred.

Methods of Preparing Syndiotactic-Rich Polyolefins

Catalyst capable of producing amorphous syndiotactic-rich polyolefins, and in particular amorphous syndiotactic-rich polypropylene include those disclosed in U.S. Pat. Nos. 5,476,914, 6,184,326, 6,245,870, 5,373,059, 5,374685, and 5,326824. Preparation of srPP polymers, in particular srPPr polymers have been disclosed in U.S. Pat. Nos. 3,305,538 and 3,258,455 to Natta et al, U.S. Pat. No. 4,892,851 to Ewen et al, U.S. Pat. No. 5,270,410 to Job, U.S. Pat. No. 5,340,917 to Eckman et al.; U.S. Pat. No. 5,476,914 to Ewen et al., and U.S. Pat. No. 7,589,145 to Brant et al., the entire disclosures of which are hereby incorporated by reference.

Polymers prepared by using the method disclosed in U.S. Pat. No. 5,476,914 with a metallocene catalyst system are preferred. Compared with other methods, the a-srPPr prepared with metallocene catalyst will have a narrower molecular weight distribution and/or more uniform comonomer distribution, as compared to the polymers produced using other catalysts, such as vanadium catalysts as disclosed in, which tend to produce polymers having ash contents greater than those of the present invention. Thus, metallocene produced a-srPP may have better physical and mechanical properties and superior processability, compared to other a-srPP. The most preferred type of a-srPP polymers is metallocene catalyzed copolymer of propylene with ethylene or butene-1 having ethylene or butene-1 comonomer content ranging from about 2 wt % to 20 wt %.

In general, a-srPP may by produced in a liquid filled, single-stage reactor such as a continuous reactor using an appropriate catalyst such as di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) zirconium dimethyl, di(p-triethylsilylphenyl)methylene(cyclopentadienyl)(3,8-di-t-butylfluorenyl) hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, and di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl.

The catalyst may be activated (or pre-activated) with an appropriate activator (cocatalyst) including alumoxane compounds, modified alumoxane compounds, and ionizing anion precursor compounds that abstract one reactive, G-bound, metal ligand making the metal complex cationic and providing a charge-balancing noncoordinating or weakly coordinating anion such as methylalumoxane (MAO) and N,N-dimethylanilinium tetrakis(pentafluorophenyl)borate. Additional preferred activators are those described at paragraphs [00121] to [00151] of International Publication No. 2004/026921]. Particularly preferred activators include those listed on page 77-78 at paragraph [00135] of International Publication No. 2004/026921.

The catalysts and catalyst systems described above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1, 4-methyl-pentene-1, hexene-1, octene-1, decene-1, 3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and International Publication No. 0130862 A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment 500 ppm or less of hydrogen may be added to the polymerization, or 400 ppm or less, or 300 ppm or less. In other embodiments at least 50 ppm of hydrogen may be added to the polymerization, or 100 ppm or more, or 150 ppm or more.

Functionalized Syndiotactic-Rich Polyolefins

Optionally, the present invention may comprise the above described amorphous syndiotactic-rich polyolefin, a functional group, and a functionalization catalyst, which may result in a functionalized amorphous syndiotactic-rich polyolefin. Preferably, the amorphous syndiotactic-rich polyolefin is amorphous syndiotactic-rich polypropylene, the functional group is maleic anhydride (MA), and a functionalization catalyst is an organic peroxide, which may result in a contact product comprising an amorphous syndiotactic-rich polypropylene functionalized with maleic anhydride.

Accordingly, the present invention may comprise the above described amorphous syndiotactic rich polyolefin which has been further functionalized with one or more additional compounds to impart one or more functionalities into the polyolefin. This functionalized amorphous syndiotactic rich polyolefin is preferably amorphous syndiotactic rich polypropylene, functionalized with maleic anhydride. Accordingly, the amorphous syndiotactic rich polyolefin may be functionalized with an unsaturated compound (e.g., compounds comprising a carbon-carbon double bond, a carbon-carbon triple bond, and/or a compound comprising a heteroatom (e.g., B, N, O, Si, P, halogens (e.g., F, Cl, Br, I), and/or S). The functional group may comprise one or a combination of an aromatic compound, a vinyl compound, an organic acid, an organic amide, an organic amine, an organic ester, an organic di-ester, an organic imide, an organic anhydride, an organic alcohol, an organic acid halide, an organic-peroxide, and/or salts or derivatives thereof.

For ease of reference, unless otherwise stated, unsaturated compound(s) and/or compound(s) comprising a heteroatom are collectively referred to herein as "a functional group or functional groups, (abbreviated FG)". By functionalized (or grafted) it is meant that one or more functional group(s) are incorporated, grafted, bonded to, physically and/or chemically attached to the amorphous syndiotactic rich polyolefin (a-srPP) of the present invention, to produce an amorphous syndiotactic rich polyolefin functionalized with a functional group (abbreviated "a-srPP-g-FG", where "-g-FG" represents the grafted functional group). Functionalization of the polyolefin preferably occurs at or on the polymer backbone, but may also occur at the polymer ends, and on portions of the polymer which are pendant to the polymer backbone. Functionalization may also occur at other functional groups, and between various polymer chains.

In a preferred embodiment the functionalized syndiotactic rich polyolefin is essentially amorphous in that essentially all of the a-srPP-g-FG of the present invention is soluble in hexane, cyclohexane, xylene or toluene at room temperature. As such, at least about 95 wt %, preferably at least about 96 wt %, preferably at least about 97 wt %, preferably at least about 98 wt %, preferably at least about 99 wt %, preferably at least about 99.5 wt % of the a-srPP-g-FG is soluble in hexane, cyclohexane, xylene or toluene at room temperature, based on the total weight of the a-srPP-g-FG present.

As an exemplary embodiment, functional groups (i.e., compounds comprising a functional group) may be grafted onto an amorphous syndiotactic rich polypropylene (a-srPPr) utilizing radical copolymerization as described in detail herein, which may include use of a free radical initiator. Such a process is referred to herein as graft copolymerization. The end result being a functionalized amorphous syndiotactic rich propylene polymer or blend of functionalized polymers. Accordingly, the present invention comprises the result of contacting a polyolefin, preferably an amorphous syndiotactic rich polyolefin, with a functional group in the presence of a free radical initiator.

Preferred examples of functional groups include unsaturated carboxylic acids and salts thereof, along with acid derivatives including, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and/or x-methyl-bicyclo(2.2.1)hept-5-ene-2,3-dicarboxylic acid anhydride (XMNA).

Examples of the esters of the carboxylic acids include esters of unsaturated carboxylic acids including methyl acrylate, ethyl acrylate, butyl acrylate, methyl methacrylate, ethyl methacrylate and butyl methacrylate.

Hydrolyzable unsaturated silane compounds may include radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid or the like. Examples thereof include vinyltrichlorosilane, vinyltris(beta-methoxyethoxy) silane, vinyltriethoxysilane, vinyltrimethoxysilane, gamma-methacryloxypropyltrimethoxysilane monovinylsilane and monoallylsilane.

Examples of unsaturated halogenated hydrocarbons include vinyl chloride and vinylidene chloride.

Preferable examples of the radical initiator used in the graft copolymerization include organic peroxides such as benzoyl peroxide, methyl ethyl ketone peroxide, cyclohexanone peroxide, t-butylperoxyisopropyl carbonate, di-ti-butyl perphthalate, 2,5-dimethyl-2,5-di(t-butylperoxy)hexene (Lupersol 101, ElfAtochem), 2,5-dimethyl-2,5-di(t-butylperoxy)hexene-3, di-t-butyl peroxide, cumene hydroperoxide, t-butyl hydroperoxide, dilauryl peroxide and dicumyl peroxide.

In a preferred embodiment, a-srPPr may be grafted with maleic anhydride (MA), to produce the functionalized amorphous syndiotactic rich polypropylene grafted with maleic anhydride (a-srPPr-g-MA), wherein the maleic anhydride may be covalently bonded to any one of the polymer chains of which the a-srPPr is comprised. The anhydride functionality grafted onto the polymer may remain as an anhydride, may be oxidized into acid and/or aldehyde functional groups, and/or may be further reacted by processes known in the art to induce other derivatives of the functional group such as amides, amines, esters, acid salts, and the like.

In a preferred embodiment the functional group is present in the functionalized polymer (e.g., a-srPP-g-FG) at about 0.005 to 99 wt %, based on the total weight of the functionalized polyolefin present. In a preferred embodiment, the functional group is present at about 0.01 wt % to 99 wt %, preferably 0.05 wt % to 90 wt %, preferably at 0.1 to 75 wt %, more preferably at 0.5 wt % to 60 wt %, more preferably at 0.5 wt % to 50 wt %, more preferably at 0.5 to 40 wt %, more preferably at 0.5 to 30 wt %, more preferably at 0.5 wt % to 20 wt %, more preferably at 0.5 wt % to 15 wt %, more preferably at 0.5 to 10 wt %, more preferably at 0.5 to 5 wt %, more preferably at 0.5 wt % to 3 wt %, more preferably at 0.5 wt % to 2 wt %, more preferably at 0.5 wt % to 1 wt %, based upon the total weight of the functionalized polyolefin or blend thereof present.

In a still more preferred embodiment, the functionalized amorphous polyolefin is amorphous syndiotactic rich polypropylene grafted maleic anhydride (a-srPPr-g-MA). In yet a more preferred embodiment, the functional group maleic anhydride, is present in the polymer or polymer blend comprising amorphous syndiotactic rich polypropylene at a concentration of about 0.005 wt % MA to 10 wt % MA, more preferably 0.01 wt % MA to 10 wt % MA, more preferably at 0.5 to 10 wt % MA, more preferably at 0.5 wt % MA to 5 wt % MA, more preferably at 1 wt % MA to 5 wt % MA, more preferably at 1 wt % MA to 2 wt % MA, more preferably at 1 wt % MA to 1.5 wt % MA, as determined as described herein and based upon the weight of the functionalized amorphous syndiotactic rich polypropylene or blend thereof present.

The functionalized amorphous syndiotactic rich polyolefin of the present invention (a-srPP-FG), preferably amorphous syndiotactic rich polypropylene functionalized with maleic anhydride (a-srPPr-g-MA) may comprise at least about 50% r-dyads, and less than about 80% r-dyads, as determined according to the Ewen method. In a preferred embodiment, a-srPPr-g-MA may include at least about 55% r dyads, preferably at least about 60% r dyads, preferably at least about 65% r dyads, preferably at least about 70% r dyads, preferably at least about 75% r dyads, more preferably less than about 80% r-dyads, based on the total number of r and m dyads present in the polymer.

A functionalized amorphous syndiotactic rich polyolefin polymer (a-srPP-g-FG), preferably amorphous syndiotactic rich polypropylene functionalized with maleic anhydride (a-srPPr-g-MA) may comprise about 6.25% to about 31.6% r-pentads, based on the total number of r-pentads present in the polymer. In a preferred embodiment, a-srPP-g-FG may include about 9.15% r-pentads to about 31.6% r-pentads, preferably about 13.0% r-pentads to about 31.6% r-pentads, preferably about 13.0% r-pentads to about 24.0% r-pentads, preferably about 17.9% r-pentads to about 24.0% r-pentads, based on the total number of r-pentads present in the polymer.

In a preferred embodiment, the functionalized amorphous syndiotactic rich polyolefin polymer is a functionalized amorphous syndiotactic rich polypropylene (a-srPPr-g-FG), preferably amorphous syndiotactic rich polypropylene functionalized with maleic anhydride (a-srPPr-g-MA). The a-srPPr-g-FG, preferably amorphous syndiotactic rich polypropylene functionalized with maleic anhydride (a-srPPr-g-MA), preferably has a weight average molecular weight (Mw) of 5,000,000 or less, preferably about 5000 to about 5,000,000; a number average molecular weight (Mn) of about 3,000,000 or less, preferably about 5000 to about 3,000,000; and a z-average molecular weight (Mz) of about 10,000,000 or less, preferably about 5000 to about 10,000,000; all of which may be determined by size exclusion chromatography, e.g., 3D SEC, also referred to as GPC-3D as described herein.

In a preferred embodiment, the a-srPPr-g-FG of the present invention, preferably amorphous syndiotactic rich polypropylene functionalized with maleic anhydride (a-srPPr-g-MA), may have a Mw of about 5,000 to about 1,000,000 g/mole, more preferably a Mw of about 10,000 to about 500,000, more preferably a Mw of about 20,000 to about 300,000, more preferably a Mw of about 50,000 to about 200,000, wherein Mw is determined as described herein.

In a preferred embodiment, the a-srPPr-g-FG of the present invention, preferably amorphous syndiotactic rich polypropylene functionalized with maleic anhydride (a-srPPr-g-MA), may have a Mn of about 2,000 g/mole to about 500,000 g/mole, more preferably a Mn of about 5,000 to about 300,000, more preferably a Mn of about 10,000 to about 200,000, more preferably a Mn of about 20,000 to about 150,000, wherein Mn is determined as described herein.

In a preferred embodiment, the a-srPPr-g-FG of the present invention, preferably amorphous syndiotactic rich polypropylene functionalized with maleic anhydride (a-srPPr-g-MA), may have a Mz of about 10,000 g/mole to about 10,000,000 g/mole, more preferably a Mz of about 20,000 to about 1,000,000, more preferably a Mz of about 40,000 to about 500,000, more preferably a Mz of about 100,000 to about 400,000, wherein Mz is determined as described herein.

In a preferred embodiment, the a-srPPr-g-FG of the present invention, preferably amorphous syndiotactic rich polypropylene functionalized with maleic anhydride (a-srPPr-g-MA), may have a crystallization temperature (Tc) measured with differential scanning calorimetry (DSC) of about 120° C. or less, more preferably, 100° C. or less, more preferably no crystallization temperature is not discernable.

In a preferred embodiment, the a-srPPr-g-FG of the present invention, preferably amorphous syndiotactic rich polypropylene functionalized with maleic anhydride (a-srPPr-g-MA), may have a melt flow rate (MFR), which is inversely related to weight average molecular weight Mw, equal to or greater than 0.2 g/10 min., preferably between 2-500 g/10 min and more preferably between 20-200 g/10 min, as measured per the ASTM D1238 (190° C., 2.16 kg) test method.

The amorphous syndiotactic rich polyolefin of the a-srPPr-g-FG, preferably amorphous syndiotactic rich polypropylene functionalized with maleic anhydride (a-srPPr-g-MA), may include alpha olefin comonomers within the base polymer. For example, a-srPPr-g-FG may include propylene ($C_3$) as the base polymer, along comonomer such as one of ethylene ($C_2$) comonomer and from $C_4$ to $C_{40}$ alpha olefin comonomer, preferably $C_4$ to $C_{20}$ alpha olefin comonomer, more preferably $C_4$ to $C_{12}$ alpha olefin comonomer, with $C_2$ and $C_4$ to $C_{10}$ alpha olefin comonomers being still more preferred.

Examples of preferred alpha olefin include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1, 4-methylepentene-1, and 4,4-dimethylepentene-1.

The amount of alpha olefin comonomer in addition to the base polymer, when present in the a-srPPr-g-FG, preferably amorphous syndiotactic rich polypropylene functionalized with maleic anhydride (a-srPPr-g-MA), may be greater than about 0.001% by weight (wt %), based on the total weight of the polymer. Preferably, the amount of the alpha olefin comonomer is greater than or equal to about 0.1 wt %, more preferably greater than or equal to about 1 wt %. The other alpha olefin comonomers may also be present in the polyolefin at about 50 wt % or less. Preferably, the amount of the other alpha olefin comonomer is less than or equal to about 20 wt %, more preferably less than or equal to about 10 wt %.

In a preferred embodiment, the a-srPP-g-FG, more preferably the a-srPPr-g-FG, still more preferably amorphous syndiotactic rich polypropylene functionalized with maleic anhydride (a-srPPr-g-MA) of the present invention may have a heat of fusion (Hf) determined according to the procedure described in ASTM E794-85, which is less than or equal to about 10 Joules/g, preferably less than or equal to about 9 Joules/g, preferably less than or equal to about 8 Joules/g, preferably less than or equal to about 7 Joules/g, preferably less than or equal to about 6 Joules/g, preferably less than or equal to about 5 Joules/g, preferably less than or equal to about 4 Joules/g, preferably less than or equal to about 3 Joules/g, preferably less than or equal to about 2 Joules/g, preferably less than or equal to about 1 Joule/g, still more preferably, a heat of fusion which is not detectable according to the procedure described in ASTM E794-85.

In a preferred embodiment, the a-srPP, more preferably the a-srPPr, prior to functionalization into a-srPP-g-FG of the present invention, preferably amorphous syndiotactic rich polypropylene functionalized with maleic anhydride (a-srPPr-g-MA), may have an ash content, determine according to the procedure described in ASTM D5630, which is less than or equal to about 1 wt %, based on the total amount of the polymer present, more preferably less than or equal to about 0.9 wt %, more preferably less than or equal to about 0.8 wt %, more preferably less than or equal to about 0.7 wt %, more preferably less than or equal to about 0.6 wt %, more preferably less than or equal to about 0.5 wt %, more preferably less than or equal to about 0.4 wt %, more preferably less than or equal to about 0.3 wt %, more preferably less than or equal to about 0.2 wt %, more preferably less than or equal to about 0.1 wt %, more preferably less than or equal to about 0.05 wt %, more preferably less than or equal to about 0.01 wt %, more preferably less than or equal to about 0.005 wt %, with an ash content, as determined according to ASTM D5630 of less than or equal to about 0.001 wt % ash content being still more preferred.

In a preferred embodiment, the functionalized amorphous syndiotactic rich polyolefin, preferably amorphous syndiotactic rich polypropylene functionalized with maleic anhydride (a-srPPr-g-MA), is heat stable, by which is meant that the Gardner color of the a-srPP-g-FG (as determined by ASTM D1544-68) that has been heat aged (e.g., maintained) at or 180° C. for 48 hours, does not change by more than 7 Gardner units when compared to the Gardner color of the initial composition. Preferably, the Gardner color of the functionalize polymer or composition comprising the functionalized polymer, after heating above its melting point for 48 hours, does not change by more than 6, more preferably 5, still more preferably 4, still more preferably 3, still more preferably 2, still more preferably 1 Gardner color unit, as compared to the initial functionalized polymer prior to being heated (e.g., prior to heat aging).

In the case of amorphous syndiotactic rich polypropylene functionalized (e.g., grafted) with maleic anhydride (a-srPPr-g-MA) it has been discovered that free acid groups present in the composition may result in reduced heat stability. Accordingly, in a preferred embodiment, the amount of free acid groups present in the a-srPPr-g-MA, or blend comprising a-srPPr-g-MA, is less than about 1000 ppm, more preferably less than about 500 ppm, still more preferably less than about 100 ppm, based on the total weight of the a-srPPr-g-MA present.

It has also been discovered that various phosphites may contribute to instability. Accordingly, in yet another preferred embodiment, the a-srPP-g-FG, more preferably the a-srPPr-g-MA, is essentially free from phosphites, by which it is meant that phosphites are present at 100 ppm or less, based on the weight of a-srPP-g-FG, more preferably the a-srPPr-g-MA.

Preparing Functionalized Syndiotactic-Rich Polyolefins

Functionalization of an amorphous syndiotactic rich polyolefin (a-srPP) with a functional group (FG) to produce a functionalized amorphous syndiotactic rich polyolefin (a-srPP-g-FG), preferably amorphous syndiotactic rich polypropylene functionalized with maleic anhydride (a-srPPr-g-MA) of the present invention, may be obtained by contacting the polymer to be functionalized along with the functional group, preferably in the presence of the radical initiator. In an preferred embodiment, the combination is heated to a temperature at, near, or above the decomposition temperature of one or more of the radical initiator(s) being used.

In some embodiments, no particular restriction need be put on the amount of functional group to be used, accordingly, conventional conditions such as may be utilized for functionalizing an isotactic polypropylene may be used to produce the functionalized amorphous syndiotactic rich polyolefin, preferably amorphous syndiotactic rich polypropylene functionalized with maleic anhydride (a-srPPr-g-MA) of the present invention. Since in some cases the efficiency of the copolymerization is relatively high, the amount of the functional group may be small (i.e., less than or equal to about 1 wt % functional group, based on the total weight of the functionalized polymer).

The radical initiator is preferably used in a ratio of from 0.00001 wt % to 10 wt %, based on the weight of the functional group. When applicable, the heating temperature depends upon whether or not the contact (e.g., the reaction) of the polymer, the functional group, and the radical initiator when used, is carried out in the presence of a solvent. The contact temperature is preferably greater than about 0° C. and less than about 500° C., with from about 50° C. to 350° C. being more preferred. When the heating temperature is less than 50° C., the reaction may be slow and thus efficiency may be low. When it is more than 350° C., decomposition of the polymer or other components may occur. Accordingly, the a-srPP, preferably the a-srPPr of the present invention may be functionalized with a functional group utilizing a solvent based functionalization process and/or utilizing a melt based functionalization process without a solvent.

In the solvent based process, the reaction may be carried out using the a-srPP, preferably the a-srPPr in solution, or as a slurry having a concentration of from 0.1 wt % to 50 wt % in the presence of a halogenated hydrocarbon compound having 2 to 20 carbon atoms, an aromatic compound, a halogenated aromatic compound, and/or an alkyl substituted aromatic hydrocarbon which is stable to the radicals.

Amorphous polyolefins, more preferably amorphous syndiotactic rich polyolefins, still more preferably amorphous syndiotactic rich polypropylene of the present invention, may be functionalized in aliphatic solvents including cyclic hydrocarbons, and/or hydrocarbons having 6 to 20 carbon atoms. Preferred aliphatic solvents include cyclohexane, hexane, and mixtures comprising cyclohexane and/or hexane.

A weight ratio of the functional group to the polyolefin or blend comprising the polyolefin to be functionalized may preferably be from 1:01 to 1:10000, and a weight ratio of the radical initiator to the functional group may be from 0.00001 to 0.1.

Solution functionalization utilizing an aliphatic solvent is a preferred functionalization method to improve heat stability of a-srPP-FG, preferably a-srPPr-g-MA.

For reaction in solution, the a-srPP may be dissolved in an appropriate solvent (e.g., an aromatic solvent such as benzene, toluene, or xylene, or an aliphatic solvent such as hexane or cyclohexane). After the solution containing a-srPP is heated to the desired temperature (e.g., from about 60° C. to 150° C.), a free radical initiator and a functional group (e.g., a reactive amide and/or maleic anhydride) may be added to initiate the grafting process. After stirring for about 30 min to about 5 hr or more, the solution is precipitated into a second solvent such as acetone, to separate functionalized polymer from unreacted modifier. The filtered product may then be dried under vacuum (e.g., at 120° C.) to afford the final functionalized amorphous polyolefin product.

Other Additives

The HMA composition can include other additives, e.g., tackifiers, waxes, antioxidants, functionalized polyolefin additives, and combinations thereof, with one or more syndiotactic-rich polyolefins, as described above.

The term "tackifier" is used herein to refer to an agent that allows the polymer of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying. An example of such a tackifier is the Escorez™ series available from ExxonMobil Chemical Company. In embodiments, the adhesive compositions may have from about 5 wt. % to about 10 wt. % of tackifier.

The term "wax" is used herein to refer to a substance that tweaks the overall viscosity of the adhesive composition. The primary function of wax is to control the set time of the adhesive system. Adhesive compositions of the present invention may comprise paraffin (petroleum) waxes and microcrystalline waxes.

In embodiments, the adhesive compositions may have no wax. In embodiments, other waxes may be used with the polymer blends of the invention including, but not limited to, Castor Oil derivatives (HCO-waxes), ethylene co-terpolymers, Fisher-Tropsch waxes, Baker-Hughes waxes (e.g., POLYWAX™ 3000), microcrystalline, paraffin, polyolefin modified, and polyolefin. In embodiments, the adhesive compositions may have less than or equal to about 15 wt. % of wax. In embodiments, the adhesive compositions may have from about 5 wt. % to about 10 wt. % of wax.

The term "antioxidant" is used herein to refer to high molecular weight hindered phenols and multifunctional phenols. A useful commercially available antioxidant is Irganox™ 1010. Irganox 1010 is a hindered phenolic antioxidant available from BASF SE Corporation located in Ludwigshafen, Germany. The invention is not limited to the Irganox 1010 as the antioxidant. In embodiments, the adhesive compositions may have no antioxidant. In embodiments, the adhesive compositions may have from about 0.01 to about 1 wt % of antioxidant, preferably about 0.5 wt. %.

The term "functionalized polyolefin additive" is used herein to refer to maleic anhydride-modified polypropylene and maleic anhydride-modified polypropylene wax. A useful commercially available functionalized polyolefin is Honeywell AC™596. AC-596 is polypropylene-maleic anhydride copolymer from Honeywell. Generally, the functionalized polyolefin additive is present in the adhesive composition in the amount of less than or equal to about 5 wt %.

Applications of Adhesive Compositions

In an embodiment, a packaging adhesive may comprise the adhesive composition of the present invention. A package may also comprise the adhesive composition of the present invention, wherein the adhesive as disclosed herein is applied to at least a portion of one or more packaging elements including paper, paperboard, containerboard, tagboard, corrugated board, chipboard, Kraft, cardboard, fiberboard, plastic resin, metal, metal alloys, foil, film, plastic film, laminates, and sheeting.

In an embodiment, the present invention may include a package comprising the adhesive composition as described herein, wherein the adhesive is applied to at least a portion of one or more packaging elements including cartons, containers, crates, cases, corrugated cases, and trays.

A package may also comprise the adhesive composition of the present invention, wherein the adhesive is applied to at least a portion of one or more packaging elements used in packaging of cereal products, cracker products, beer packaging, frozen food products, paper bags, drinking cups, milk cartons, juice cartons, drinking cups, and containers for shipping produce.

In an embodiment, the adhesive composition adheres two substrates, wherein each substrate comprises at least one of paper, cardboard, plastic, nonwoven, metal, wood, other natural fiber based material, or combinations thereof.

EXAMPLES

Preparation of Adhesive Polymer Blends

In a pilot plant, propylene-ethylene copolymers were produced by reacting a feed stream of propylene with a feed stream of ethylene in the presence of a metallocene catalyst. Properties of propylene-ethylene copolymers (P1-P9) used in the Examples, including Brookfield Viscosity at 190° C., Ethylene Content, DSC Melting Point, and crystallinity (Heat of Fusion, Hf) are contained in Table 1. These polymer blends were generally produced in accordance with the method disclosed in International Publication No. WO 2013/134038 although P1 and P2 were prepared in a laboratory-scale single reactor in the presence of a metallocene catalyst.

Preparation of Syndiotactic-Rich Polypropylene

Polymerization of the amorphous syndiotactic-rich polypropylene samples S1, S2 were carried out in a liquid filled, single-stage 0.5 liter stainless steel autoclave continuous reactor using diphenylmethylene(fluorenyl)(cyclopentadienyl)hafnium dimethyl pre-activated with N,N-dimethylanilinium tetrakis(pentafluorophenyl)borate. The reactor is equipped with a stirrer, a water cooling/steam-heating element with a temperature controller, and a pressure controller. Solvent and propylene were purified by passing through a three-column purification system prior to pumping into the reactor. All catalyst solutions were kept in an inert atmosphere with <1.5 ppm water content and fed into reactor by metering pumps. Catalyst and monomer contacts took place in the reactor.

The reactor was first cleaned by continuously pumping hexane and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Beginning of polymerization activity was deduced from observation of a viscous discharge product and lower temperature of the water-steam mixture. Once activity was established and system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. Methanol was used as catalyst deactivation agent. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 350 psig and in the temperature range of 80° C. to 120° C. The polymerization temperature was changed to vary the molecular weight and tacticity of the polymer. Polymerization temperature was held 120° C. to achieve a lower molecular weight for S1. For S2, the polymerization temperature was held at 107° C. to achieve a higher molecular weight.

The amorphous syndiotactic-rich polypropylene samples were then functionalized by dissolving about 120 g of the polymer in toluene to produce a polymer solution having a polymer concentration of about 20 wt %. 15 wt % maleic anhydride (based on the particular a-srPPr used) was then added to the solution, along with 2.5 wt % of the radical initiator, 2,5-dimethyl-2,5-di(t-butylperoxyl)hexane. The reaction temperature was 139° C. for about 4 hours. Detailed polymer properties are listed in Table 2. Molecular weight (Mw) were obtained by GPC-3D using light scattering detector. Polydispersity (Mw/Mn) were obtained with Mn determined by the differential refractive index detector of the GPC-3D. BV denotes Brookfield Viscosity.

Preparation of Adhesive Polymer Compositions

Example adhesive polymer compositions were produced from blends of the propylene-ethylene copolymers, syndiotactic rich polypropylene polymers (srPP), as well as other additives. Weight percent composition and properties of example adhesive polymer compositions used in the Examples are contained in Tables 3 and 4. The adhesive polymer compositions were prepared by preheating one or more polymer blends (of P1 and P2) with one or more functionalized amorphous syndiotactic-rich polyolefins (srPP S1 and srPP S2) and other additives to about 180° C. in a glass beaker. The components were blended by manual stirring using a spatula.

Table 3 lists inventive adhesive polymer compositions (containing quantities of S1 or S2) I2 through I4 compared to blends C3 and C4 without srPP or compared to blend C10 with srPP S1. For additional comparison, Table 3 lists properties for polymers C1 and C2 comprising either P1 or P2 but not both. Table 4 lists inventive polymer compositions (containing quantities of S1) I5, I6, I7, and I8 compared to blends C5, C6, C7, and C8 without srPP additive. For additional comparison, Table 4 lists adhesive properties for polymer C9 comprising srPP S1 alone.

Tables 3 and 4 show hot melt adhesive (HMA) compositions based on P1, P2, and S2 or S1. All compositions in Tables 3 and 4 have constant concentration for additives, wax, anti-oxidant, etc. All compositions in Tables 3 and 4 have low viscosity which is desirable for melt processability, except for C9 which comprises only srPP Si. Additionally, all compositions in Tables 3 and 4 have desirable short set times, except for comparative compositions C1 and C2 which comprise either only P1 or only P2. All inventive compositions have good fiber tear. Blend C10 has srPP and improved fiber tear over C3, but C10 does not have desired good fiber tear at all temperatures. Without being bound by theory, the unsatisfactory fiber tear for C10 is attributed to lower $C_2*BV$ value resulting from high concentration of P1. Compare the poor fiber tear of example composition C1 composed primarily of only P1 with the good fiber tear of composition C2 composed primarily of only P2. Additionally, note that I2 has higher $C_2*BV$ than C10 due to the higher BV of S2 component in I2. (See Table 2.) All compositions with added srPP (C10, I2 through I4) in Table 3 show improved fiber tear over corresponding comparative blends C3 and C4 without srPP. The improvement in fiber tear with addition of srPP is not as noticeable for the inventive compositions (I5 through I8) in Table 4 because the comparison blends C5, C6, C7, and C8 already have good fiber tear. Again, without being bound by theory, the existing good fiber tear for comparison blends C5 through C8 is attributed to lower P1 and higher P2 concentrations in the blends. However, as mentioned, all inventive compositions (I5 through I8) in Table 4 have good fiber tear at all test temperatures.

All inventive compositions (I2 through I8) have improved adhesion (PAFT) over corresponding compositions without srPP. The adhesion model relationship, illustrated in FIG. 1, of increasing adhesion as $C_2*BV$ increases applies to the inventive compositions and comparative blends found in Tables 3 and 4. (Note that inventive compositions I2 through I8 and comparative blends C3 through C8 have low viscosity making the simplifying assumption for constant B term applicable.) The $C_2*BV$ values increase as srPP is added to the inventive adhesive compositions because of the higher BV of the srPP. (See Tables 2, 3, and 4.) Accordingly, the adhesion model indicates adhesion for the inventive adhesive compositions I2 through I8 containing srPP is improved having higher adhesion than the corresponding comparative blends without srPP (C3 through C8). Therefore, PAFT (a measure of adhesion at high temperature) for inventive adhesive compositions I2 through I8 is improved (higher) over the PAFT of the corresponding comparative blends without srPP (C3 through C8). In summary, it has been observed that improved adhesion at low, room, and high temperatures (−18° C., 2° C., 25° C., and PAFT) by a higher $C_2*BV$ value of the inventive adhesive composition is consistent with the prediction of the adhesion model. Also, this blending approach of P1, P2, and S1 or S2 does not decrease melt processability significantly and lengthen set time of the HMA.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

TABLE 1

|  | P1 | P2 | P3 | P4 | P5 | P6 | P7 | P8 | P9 |
|---|---|---|---|---|---|---|---|---|---|
| Wt % $C_2$ | 4.7 | 15 | 5.9 | 6.1 | 5.5 | 5.9 | 6.3 | 6.5 | 6.8 |
| BV@190° C., cP | 583 | 510 | 1275 | 1142 | 1112 | 1022 | 980 | 1235 | 1115 |
| $T_m$, ° C. | 129 | 55 | 85 | 88 | 107 | 89 | 122 | 99 | 106 |
| $H_f$, J/g | 85 | 15 | 38 | 43 | 49 | 40 | 38 | 37 | 42 |

TABLE 2

|  | S1 | S2 |
|---|---|---|
| Mw (kg/mole) | 50 | 86 |
| Mw/Mn | 2.45 | 2.53 |
| g' | 0.991 | 1.05 |
| BV at 190° C. (cP or mPa · s) | 9375 | 238,000 |
| Tg (° C.) | −5.5 | 0 |
| Triad mole fraction ($^{13}$C NMR) | | |
| mm | 0.152 | 0.133 |
| mr + rm | 0.483 | 0.464 |
| rr | 0.365 | 0.403 |
| Diad mole fraction ($^{13}$C NMR) | | |
| m | 0.394 | 0.365 |
| r | 0.606 | 0.635 |

TABLE 3

| Weight % | C1 | C2 | C3 | C10 | I2 | C4 | I3 | I4 |
|---|---|---|---|---|---|---|---|---|
| P1 | 80 | — | 56 | 56 | 56 | 48 | 48 | 48 |
| S1 | — | — | — | 8 | — | — | 8 | — |
| S2 | — | — | — | — | 8 | — | — | 8 |
| P2 | — | 80 | 24 | 16 | 16 | 32 | 24 | 24 |
| Escorez ™ 5400 | 8 | 8 | 8 | 8 | 8 | 8 | 8 | 8 |
| POLYWAX ™ 3000 | 8 | 8 | 8 | 8 | 8 | 8 | 8 | 8 |
| A-C ™ 596 | 3 | 3 | 3 | 3 | 3 | 3 | 3 | 3 |
| Irganox ™ 1010 | 1 | 1 | 1 | 1 | 1 | 1 | 1 | 1 |
| $C_2$*BV, (wt %*cP) | 2740 | 7650 | 4363 | 4713 | 6513 | 4874 | 5412 | 7479 |
| HMA Performance | | | | | | | | |
| Brookfield Viscosity @177° C., (cP) | 70 | 435 | 710 | 998 | 1480 | 703 | 935 | 1792 |
| Set Time, s | 5.5-8.0 | 10+ | 1.5 | 1.5 | 1.5 | 1.5 | 1.5 | 1.5 |
| % Fiber Tear to 84 C., 25° C. | 0 | 100 | 1.7 | 57 | 91 | 93 | 96 | 95 |
| % Fiber Tear to 84 C., 2° C. | 0 | 98 | 60 | 80 | 94 | 78 | 96 | 91 |
| % Fiber Tear to 84 C., −18° C. | 0 | 99 | 58 | 37 | 93 | 62 | 99 | 90 |
| $T_c$, ° C. | 94, 110 | 110 | 92, 110 | 93, 110 | 91, 109 | 92, 110 | 92, 110 | 92, 110 |
| $T_m$, ° C. | 121 | 120, 55 | 120 | 120 | 120 | 120 | 120 | 121 |
| $H_f$, J/g | 73 | 39 | 55 | 61 | 53 | 51 | 56 | 50 |

TABLE 4

| Weight % | C5 | I5 | C6 | I6 | C7 | I7 | C8 | I8 | C9 |
|---|---|---|---|---|---|---|---|---|---|
| P1 | 42 | 42 | 36 | 36 | 30 | 30 | 24 | 24 | — |
| S1 | — | 8 | — | 8 | — | 8 | — | 8 | 80 |
| P2 | 38 | 30 | 44 | 36 | 50 | 42 | 56 | 48 | — |
| Escorez ™ 5400 | 8 | 8 | 8 | 8 | 8 | 8 | 8 | 8 | 8 |
| POLYWAX ™ 3000 | 8 | 8 | 8 | 8 | 8 | 8 | 8 | 8 | 8 |

TABLE 4-continued

| Weight % | C5 | I5 | C6 | I6 | C7 | I7 | C8 | I8 | C9 |
|---|---|---|---|---|---|---|---|---|---|
| A-C ™ 596 | 3 | 3 | 3 | 3 | 3 | 3 | 3 | 3 | 3 |
| Irganox ™ 1010 | 1 | 1 | 1 | 1 | 1 | 1 | 1 | 1 | 1 |
| $C_2$*BV, (wt %*cP) | 5248 | 5924 | 5614 | 6424 | 5972 | 6915 | 6323 | 7394 | 0 |
| HMA Performance | | | | | | | | | |
| Brookfield Viscosity@ 177° C., (cP) | 665 | 825 | 652 | 863 | 631 | 870 | 605 | 866 | 7075 |
| Set Time, s | 1.0 | 1.5 | 1.0-1.5 | 1.5 | 1.0-1.5 | 1.5 | 1.0-1.5 | 1.5 | 2.0 |
| % Fiber Tear to 84 C., 25° C. | 100 | 97 | 100 | 98 | 100 | 99 | 100 | 100 | 97 |
| % Fiber Tear to 84 C., 2° C. | 100 | 98 | 100 | 99 | 100 | 99 | 100 | 99 | 95 |
| % Fiber Tear to 84 C., −18° C. | 100 | 98 | 100 | 98 | 100 | 99 | 100 | 100 | 90 |
| $T_c$, ° C. | | 90, 109 | | 89, 109 | | 90, 109 | | 90, 109 | 111 |
| $T_m$, ° C. | | 120 | | 119 | | 120 | | 120 | 121 |
| $H_f$, J/g | 50 | 46 | | 38 | | 36 | | 32 | 21 |

I claim:

1. An adhesive composition comprising:
  i) a polymer blend comprising
    a first propylene-based polymer, wherein the first propylene-based polymer is a copolymer of propylene and ethylene; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
    wherein the polymer blend has a melt viscosity, measured at 190° C. of about 900 cP to about 19,000 cP; and
  ii) a syndiotactic-rich polyolefin comprising greater than about 50 wt % of a $C_3$-$C_{40}$ alpha olefin and having about 50% to less than about 80% r dyads, based on the total number of r and m dyads present in the polymer, a heat of fusion of 10 joules/g or less, and a g' index of about 0.9 to about 1.5,
    wherein the adhesive composition has a ($C_2$ * BV) value ≥4900 wt % *cP.

2. The adhesive composition of claim 1, comprising at least 5 wt % of the syndiotactic-rich polyolefin.

3. The adhesive composition of claim 1, comprising at least 10 wt % of the syndiotactic-rich polyolefin.

4. The adhesive composition of claim 1, wherein the syndiotactic-rich polyolefin has at least about 58% r dyads.

5. The adhesive composition of claim 1, wherein the syndiotactic-rich polyolefin further comprises greater than about 60 wt % propylene.

6. The adhesive composition of claim 1, wherein the syndiotactic-rich polyolefin has a weight average molecular weight of about 50,000 to about 100,000 g/mole.

7. The adhesive composition of claim 1, further comprising a combination of one or more of the polymer blends.

8. The adhesive composition of claim 1, further comprising a combination of one or more of the syndiotactic-rich polyolefins.

9. The adhesive composition of claim 1, further comprising a single tackifier or a blend of one or more tackifiers present in the amount of about 5 wt. % to about 10 wt. % of the adhesive composition.

10. The adhesive composition of claim 1, further comprising an antioxidant present in the amount of about 0.01 to about 1 wt % of the adhesive composition.

11. The adhesive composition of claim 1, further comprising a wax present in the amount of less than or equal to about 15 wt % of the adhesive composition.

12. The adhesive composition of claim 1, further comprising a functionalized polyolefin additive present in the amount of less than or equal to about 5 wt %.

13. An article comprising the adhesive composition of claim 1.

14. The article of claim 13, wherein the adhesive composition adheres two substrates, and wherein each substrate comprises at least one of paper, cardboard, plastic, nonwoven, metal, wood, other natural fiber based material, or combinations thereof.

15. An adhesive composition comprising:
  i) a polymer blend comprising
    a first propylene-based polymer, wherein the first propylene-based polymer is a copolymer of propylene and ethylene; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
    wherein the polymer blend has a melt viscosity, measured at 190° C. of about 900 cP to about 19,000 cP; and
  ii) a syndiotactic-rich polyolefin that has been functionalized with a functional group; wherein prior to being functionalized, the syndiotactic-rich polyolefin comprises greater than about 50 wt % of a $C_3$-$C_{40}$ alpha olefins; and has about 50% to less than about 80% r dyads, based on the total number of r and m dyads present in the polymer, a heat of fusion of 10 joules/g or less, and a g' index of about 0.9 to about 1.5,
    wherein the adhesive composition has a ($C_2$ * BV) value ≥4900 wt %*cP.

16. The adhesive composition of claim 15, wherein the functional group comprises B, N, O, Si, P, F, Cl, Br, I, S, or a combination thereof.

17. The adhesive composition of claim 15, wherein the functional group is one or a combination of an aromatic compound, a vinyl compound, an organic acid, an organic amide, an organic amine, an organic ester, an organic di-ester, an organic imide, an organic anhydride, an organic alcohol, an organic acid halide, an organic peroxide, and/or salts thereof.

18. The adhesive composition of claim 15, wherein the functional group is maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,& 6, octahydronaphthalene-2,3-dicarboxylic acid anhydride, 2-ox a-1,3-diketo spiro(4.4) non-7-ene, bicyclo(2.2.1)hept-5-ene-2,3- dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, x-methyl-bicyclo(2.2.1)hept-5-ene-2,3-dicarboxylic acid anhydride, methyl acrylate, ethyl acrylate, butyl acrylate, methyl methacrylate, ethyl methacrylate, butyl methacrylate, vinyltrichlorosilane, vinyltris(beta-methoxyethoxy)silane, vinyltriethoxysilane, vinyltrimethoxysilane, gamma-methacryloxypropyltrimethoxysilane monovinylsilane, monoallylsilane, vinyl chloride, or vinylidene chloride.

19. The adhesive composition of claim 15, comprising at least 5 wt % of the functionalized syndiotactic-rich polyolefin.

20. The adhesive composition of claim 15, comprising at least 10wt % of the functionalized syndiotactic-rich polyolefin.

21. A process to prepare an adhesive composition, comprising blending
   i) a polymer blend comprising
   a first propylene-based polymer, wherein the first propylene-based polymer is a copolymer of propylene and ethylene; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
   wherein the polymer blend has a melt viscosity, measured at 190° C. of about 900 cP to about 19,000 cP; and
   ii) a syndiotactic-rich polyolefin comprising greater than about 50 wt % of a $C_3$-$C_{40}$ alpha olefin and having about 50% to less than about 80% r dyads, based on the total number of r and m dyads present in the polymer, a heat of fusion of 10 joules/g or less, and a g' index of about 0.9 to about 1.5,
   wherein the adhesive composition has a ($C_2$ * BV) value ≥4900 wt %*cP.

22. The process of claim 21, wherein the syndiotactic-rich polyolefin is functionalized with a functional group, wherein the functional group comprises B, N, O, Si, P, F, Cl, Br, I, S, or a combination thereof.

* * * * *